United States Patent
Oishi

(10) Patent No.: US 11,123,897 B2
(45) Date of Patent: Sep. 21, 2021

(54) BARREL BLOCK FOR TWIN-SCREW EXTRUDER AND TWIN-SCREW EXTRUDER

(71) Applicant: Toshiba Kikai Kabushiki Kaisha, Chiyoda-ku (JP)

(72) Inventor: Masanobu Oishi, Fuji (JP)

(73) Assignee: Toshiba Kikai Kabushiki Kaisha, Chiyoda-ku (JP)

( * ) Notice: Subject to any disclaimer, the term of this patent is extended or adjusted under 35 U.S.C. 154(b) by 460 days.

(21) Appl. No.: 16/228,826

(22) Filed: Dec. 21, 2018

(65) Prior Publication Data
US 2019/0202086 A1 Jul. 4, 2019

(30) Foreign Application Priority Data
Dec. 28, 2017 (JP) .............................. JP2017-253943

(51) Int. Cl.
*B29B 7/48* (2006.01)
*B29C 48/68* (2019.01)
*B29C 48/25* (2019.01)
*B30B 11/24* (2006.01)

(52) U.S. Cl.
CPC ................ *B29B 7/48* (2013.01); *B29B 7/488* (2013.01); *B29C 48/2565* (2019.02); *B29C 48/682* (2019.02); *B30B 11/243* (2013.01)

(58) Field of Classification Search
CPC ......... B29B 7/48; B29B 7/488; B29C 48/682; B29C 48/2565; B29C 45/62; B29C 2045/623; B29C 2045/626; B29C 48/688; B30B 11/243; F16B 7/182
USPC ......................................................... 366/69
See application file for complete search history.

(56) References Cited

U.S. PATENT DOCUMENTS

| 4,028,027 A | 6/1977 | Worz |
| 5,209,937 A * | 5/1993 | Kangas .................... F04C 2/086 425/183 |
| 5,667,299 A * | 9/1997 | Mizoguchi ............ B01F 15/065 366/145 |
| 7,585,101 B2 * | 9/2009 | Watanabe ............... B29C 48/02 366/69 |

(Continued)

FOREIGN PATENT DOCUMENTS

| CN | 102107517 A | 6/2011 |
| CN | 104669584 | 6/2015 |

(Continued)

OTHER PUBLICATIONS

Combined Chinese Office Action and Search Report dated Sep. 23, 2020 in the corresponding Chinese Patent Application No. 201811598273.5, (with English Translation), 11 pages.

(Continued)

*Primary Examiner* — Charles Cooley
(74) *Attorney, Agent, or Firm* — Oblon, McClelland, Maier & Neustadt, L.L.P.

(57) ABSTRACT

A barrel block for a twin-screw extruder constitutes a barrel including a cylinder and has joints at both ends. A first joint includes a first inner joint face on a peripheral edge of a first hole of an insertion hole for screws, and includes a first flank face and a first outer joint face on an outer periphery of the first inner joint face. The first outer joint face is located in the outer periphery of a plurality of first bolt holes. The first outer joint face is more recessed toward a second block end face than the first inner joint face.

3 Claims, 4 Drawing Sheets

(56) References Cited

U.S. PATENT DOCUMENTS

2005/0259507 A1 11/2005 Ronkin et al.
2011/0063939 A1 3/2011 Padmanabhan
2019/0202086 A1* 7/2019 Oishi ........................ B29B 7/48

FOREIGN PATENT DOCUMENTS

| CN | 105612042 A | 5/2016 |
| CN | 205310763 U | 6/2016 |
| CN | 206633381 U | 11/2017 |
| EP | 2368689 A1 * | 3/2011 |
| JP | 50-156007 | 12/1975 |
| JP | 10-235712 A | 9/1998 |
| KR | 10-0483141 B1 | 4/2005 |

OTHER PUBLICATIONS

Office Action dated Oct. 26, 2020 in the corresponding Korean Patent Application No. 10-2018-0165810 (with English Translation), 4 pages.

\* cited by examiner

BARREL BLOCK FOR TWIN-SCREW EXTRUDER AND TWIN-SCREW EXTRUDER

CROSS-REFERENCE TO RELATED APPLICATIONS

This application is based upon and claims the benefit of priority from Japanese Patent Application No. 2017-253943, filed Dec. 28, 2017, the entire contents of which are incorporated herein by reference.

FIELD

The embodiment relates generally to a barrel block for a twin-screw extruder and a twin-screw extruder.

BACKGROUND

A twin-screw extruder is provided with a barrel that includes a cylinder for rotatably housing two screws. The barrel integrally includes a plurality of joined barrel blocks for a twin-screw extruder. Each of the barrel blocks includes joints at both ends, and a cylinder part that penetrates through the joints.

For example, barrel blocks for a twin-screw extruder are aligned in a certain direction such that the joints of the adjacent barrel blocks are in contact with each other. The joints are then joined together and fastened with bolts. Thereby, a continuous barrel of the joined barrel blocks is created. The barrel includes a continuous cylinder including a plurality of mutually connected cylinder parts. In this manner, the barrel for a twin-screw extruder including the cylinder that rotatably houses two screws can be produced.

In a twin screw extruder, raw materials are put into the cylinder and kneaded while conveyed by two simultaneously rotating screws. After that, the kneaded materials are extruded from, for example, a gap (outlet) of a certain shape or contour. In this manner, a product having a certain shape or contour is processed.

Raw materials to convey along the cylinder are various kinds of raw materials including not only raw materials having high or low viscosity but also liquid raw materials having fluidity. The interior of the cylinder is subjected to high pressure. Thus, raw materials are constantly subjected to high pressure while conveyed inside the cylinder. This may cause the raw materials, depending on the internal pressure of the cylinder or the kind of the raw materials, to partially leak from the gap between the barrel blocks (that is, gap between the joints) during the kneading process.

Japanese Laid-open Patent Application Publication No. S50-156007 describes a screw casing (i.e., a barrel block) including, at both ends, flanged joints with protrusions around a screw hole (i.e., a cylinder). Owing to such structure, screw casings are joined together, with the parts around the screw holes in close contact with one another. This is intended to prevent raw materials from leaking from the gap between the screw casings (i.e., the gap between the joints).

However, according to Japanese Laid-open Patent Application Publication No. S50-156007, the flanged joints may fall in accordance with the fastening amount of bolts, at the time of joining the screw casings together. In this case, the screw casings may unevenly contact each other about the screw holes depending on how much the joints fall, which makes it impossible to maintain a uniform contact state (for example, contact pressure) of the screw casings. Low contact pressure in the part along the periphery of the screw holes may cause leakage of raw materials from the part.

An object of the embodiment is to provide barrel blocks for a twin-screw extruder which are joined together with parts around a cylinder brought into tight and uniform contact with each other, so as to prevent raw materials from leaking between the barrel blocks.

SUMMARY

According to one embodiment, a barrel block for a twin-screw extruder constitutes a barrel and includes joints at both ends. The barrel includes a cylinder that rotatably houses two screws. The barrel block includes a block body of a rectangular parallelepiped shape that includes a first block end face, a second block end face opposite the first block end face, and four block side faces that connect the first block end face and the second block end face; a first flange of a rectangular frame shape that projects toward an outer periphery from an outer peripheral edge of the first block end face; a second flange of a rectangular frame shape that projects toward an outer periphery from an outer peripheral edge of the second block end face; a plurality of first bolt holes formed in the first flange with spacing and a plurality of second bolt holes formed in the second flange with spacing, the first and second bolt holes that surround the block body; and a cylinder part that passes the block body straight from the first block end face to the second block end face and defines an insertion hole for the screws, wherein the first block end face and an end face of the first flange forms a first joint; and the first joint includes a first inner joint face, a first flank face, and a first outer joint face, the first inner joint face that continuously surrounds a peripheral edge of the insertion hole for the screws, the first flank face that is recessed from the outer periphery of the first inner joint face toward the second block end face, the first outer joint face that is located at a tip of a first projection that projects from the first flank face in the outer periphery of the first bolt holes; and the first outer joint face is more recessed toward the second block end face than the first inner joint face.

DETAILED DESCRIPTION OF THE PREFERRED EMBODIMENTS

Figure 1:
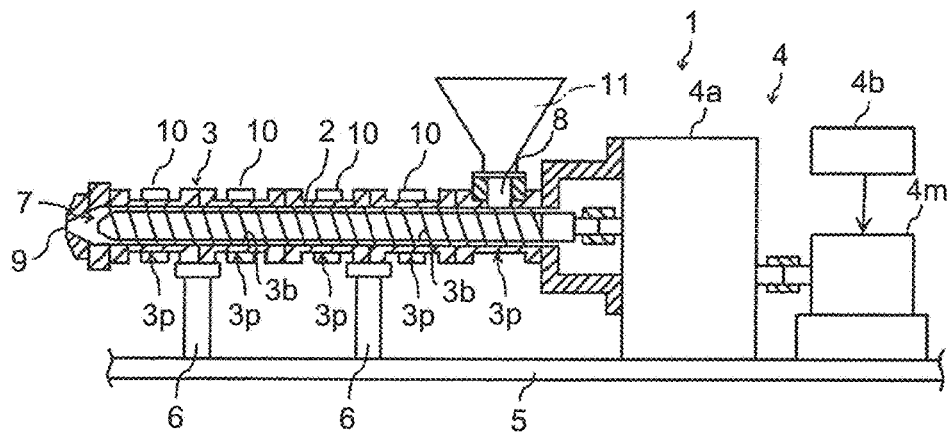
FIG. 1 is a cross-sectional view illustrating the whole structure of a twin-screw extruder in accordance with an embodiment of the present invention.

As illustrated in FIG. 1, a twin-screw extruder 1 according to an embodiment includes two screws 2, a continuous barrel 3, and an extruder body 4. The barrel 3 is fixed at its base end to the extruder body 4s, and is supported in a horizontal posture by a plurality of struts 6 raised from a base 5.

The barrel 3 integrally includes a plurality of joined barrel blocks 3p for a twin screw extruder, which will be described later, and further includes a continuous cylinder 7 in one direction. The cylinder 7 is made of mutually connected cylinder parts 3b, which will be described later. The two screws 2 are rotatably housed in the cylinder 7 while coupled to the extruder body 4. FIG. 1 illustrates only one of the screws 2.

The barrel 3 is provided with an inlet 8 of a raw material and an outlet 9 of a kneaded material in addition to the cylinder 7.

The barrel 3 further include a heating device 10 (for example, a heater) attached thereto. The heating device 10 can heat the barrel 3 to maintain the barrel 3 at a preset temperature.

The extruder body 4 includes a drive mechanism 4a and a controller 4b. The controller 4b controls the rotation of a motor 4m of the drive mechanism 4a to rotate the two screws 2. Thereby, inserted (housed) in the cylinder 7, the two screws 2 are rotatable while meshing with each other.

A raw material is supplied to a hopper 11. The supplied raw material is introduced into the cylinder 7 through the inlet 8. The introduced raw material is melted and kneaded, and is conveyed to the outlet 9 by the heating device 10 and the two rotating screws 2. In this manner, the kneaded, molten material (kneaded material) is continuously discharged from the outlet 9.

Figure 2:
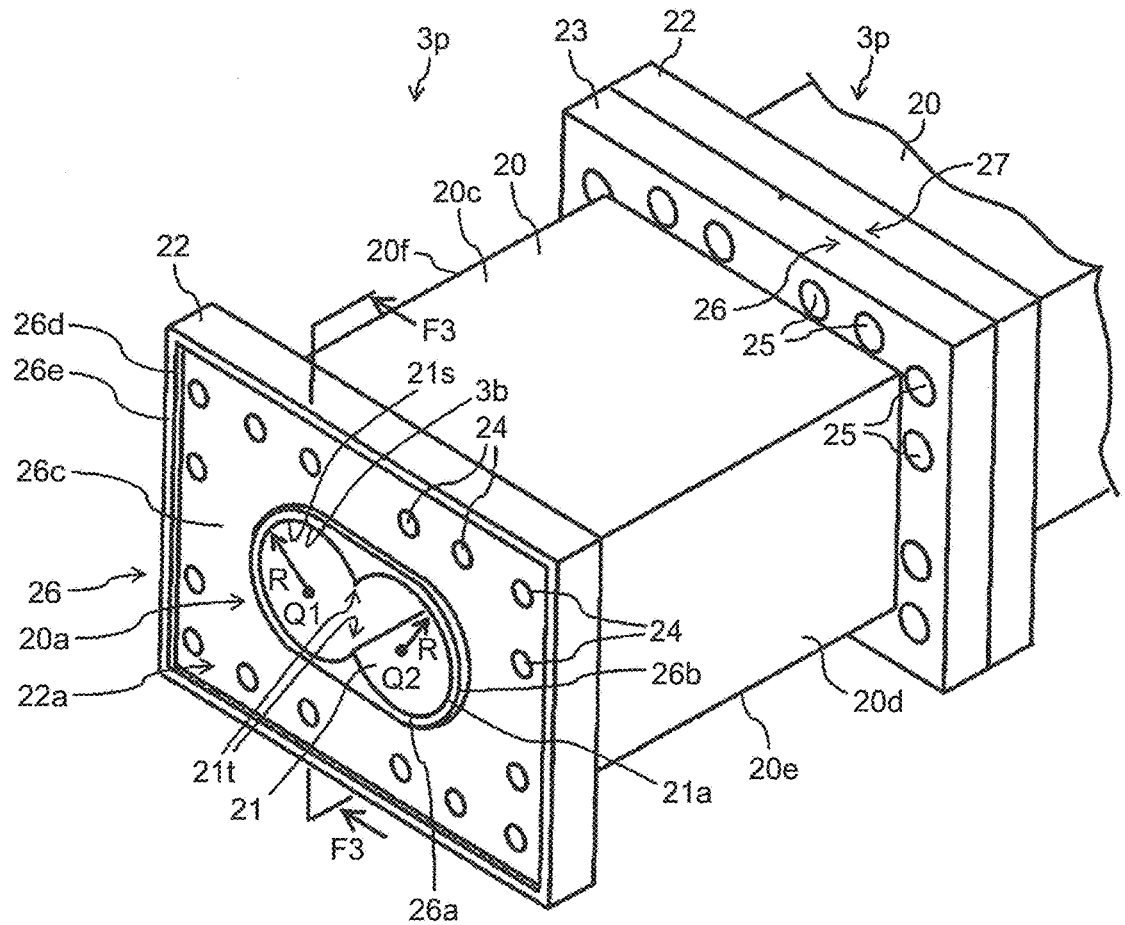
FIG. 2 is a perspective view illustrating the structure of barrel blocks for the twin-screw extruder in accordance with the embodiment of the present invention.
Figure 3:
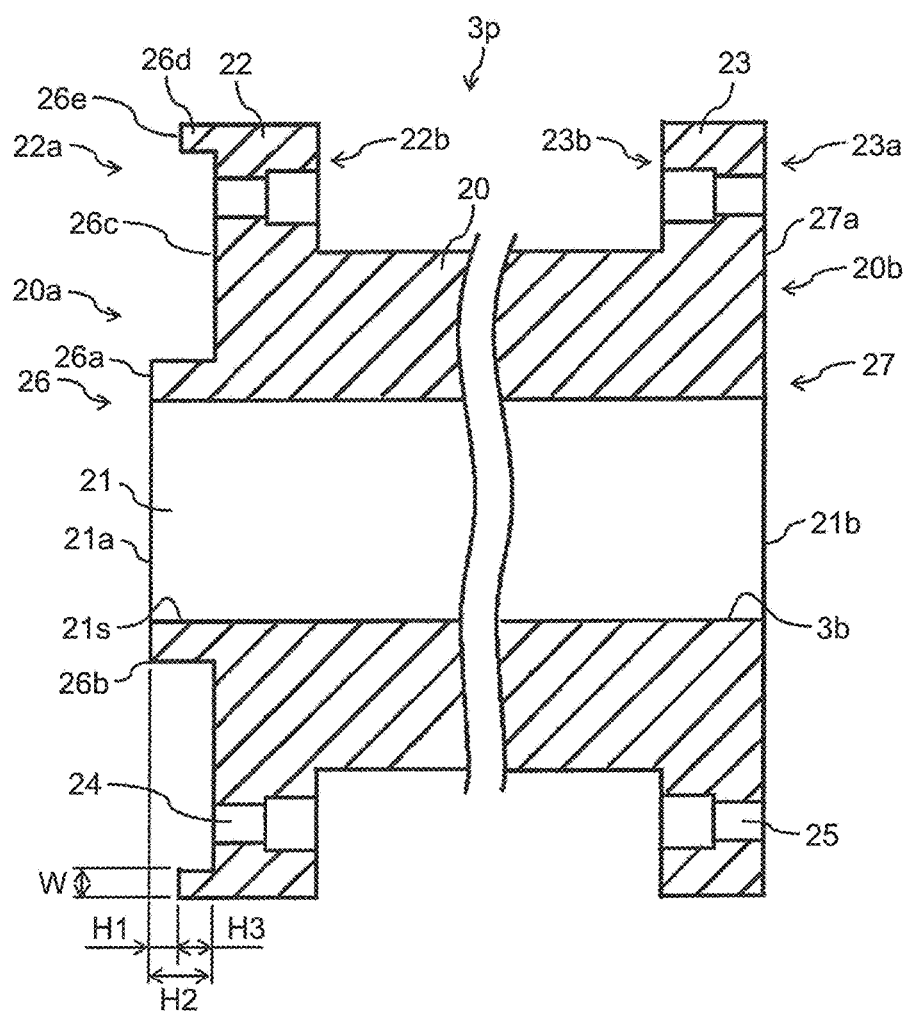
FIG. 3 is a cross-sectional view of the barrel blocks along the line F3-F3 in FIG. 2.

The following describes the structure of each of the barrel blocks 3p. FIGS. 2 and 3 illustrate the barrel block 3p for a twin-screw extruder, the barrel block 3p of the barrel 3 including the cylinder 7.

In the twin-screw extruder 1 of the present embodiment, the extending direction of the cylinder 7 on the horizontal plane is defined as a longitudinal direction.

The barrel block 3p includes a block body 20, a first flange 22, a second flange 23, and a cylinder part 3b.

The block body 20 has a rectangular parallelepiped shape. Specifically, the block body 20 includes a first block end face 20a being one end face, and a second block end face 20b being the other end face opposite the first block end face 20a. The first block end face 20a and the second block end face 20b have the same rectangular shape.

The block body 20 further includes four rectangular block side faces 20c, 20d, 20e, and 20f that connect the first block end face 20a and the second block end face 20b.

The block body 20 is provided with the first flange 22 that is integrally formed with the first block end face 20a, projecting from an outer peripheral edge of the first block end face 20a toward an outer periphery. The block body 20 is also provided with the second flange 23 that is integrally formed with the second block end face 20b, projecting from an outer peripheral edge of the second block end face 20b toward an outer periphery. The first flange 22 and the second flange 23 have the same rectangular frame shape.

The first flange 22 has a certain thickness in the longitudinal direction. The four block side faces 20c, 20d, 20e, and 20f are perpendicular to the first flange 22 at the outer peripheral edge of the first block end face 20a. In the area corresponding to the certain thickness from the edges of the four block side faces 20c, 20d, 20e, the first flange 22 and the four block side faces 20c, 20d, 20e, and 20f are integrated. Similarly, the second flange 23 has a certain thickness in the longitudinal direction. The four block side faces 20c, 20d, 20e, and 20f are perpendicular to the second flange 23 at the outer peripheral edge of the second block end face 20b. In the area corresponding to the thickness from the edges of the four block side faces 20c, 20d, 20e, and 20f, the second flange 23 and the four block side faces 20c, 20d, 20e, and 20f are integrated.

The first flange 22 includes a first flange end face 22a being one end face, facing in the same direction as the first block end face 20a. The first flange 22 includes a first flange rear face 22b being the other end face opposite the first flange end face 22a. The first flange end face 22a continuously extends from the outer peripheral edge of the first block end face 20a along the outer periphery.

Similarly, the second flange 23 includes a second flange end face 23a being one end face, facing in the same direction as the second block end face 20b. The second flange 23 includes a second flange rear face 23b being the other end face opposite the second flange end face 23a. The second flange end face 23a continuously extends from the outer peripheral edge of the second block end face 20b along the outer periphery.

The first flange 22 is provided with a plurality of first bolt holes 24, and the second flange 23 is provided with a plurality of second bolt holes 25. In the present embodiment, every two adjacent barrel blocks 3p are joined together and fastened with bolts (not illustrated) and nuts (not illustrated), and the number of the first bolt holes 24 and the number of the second bolt holes 25 are the same. The first bolt holes 24 and the second bolt holes 25 are formed in the same location of the first flange 22 and the second flange 23 of the same rectangular frame shape, respectively. In other words, the first bolt holes 24 in the first flange 22 and the second bolt holes 25 in the second flange 23 are in the same arrangement.

The first bolt holes 24 and the second bolt holes 25 are both arranged in rectangular or substantially rectangular form surrounding the block body 20. The rectangular arrangement signifies that the centers of circular cross sections of the first bolt holes 24 and the second bolt holes 25 at certain spacing are on the rectangular frame lines. The substantially rectangular arrangement signifies that at least any location of the circular cross sections of the first bolt holes 24 and the second bolt holes 25 intersects with or contacts the rectangular frame line.

The block body 20 is further provided with a through-hole 21 that passes straight through the center of the block body 20 in the longitudinal direction from the first block end face 20a to the second block end face 20b. The through-hole 21 is a hole into which the two screws 2 are inserted, defining the cylinder 7 that rotatably houses the two screws. Hereinafter, the through-hole 21 is referred to as the insertion hole 21.

As viewed from the longitudinal direction, the first block end face 20a is provided in the center with a first hole 21a of the insertion hole 21. The second block end face 20b is provided in the center with a second hole 21b of the insertion hole 21. The first hole 21a and the second hole 21b have the same shape of spectacles that are two circles of the same radius R intersecting with each other. The centers Q1 and Q2 of the two circles are located on the same horizontal plane when the long sides of the outer peripheral edges of the rectangular first block end face 20a and second block end face 20b are horizontally aligned.

The insertion hole 21 is in communication with the first hole 21a and the second hole 21b, and includes two cylindrical holes aligned in parallel in the longitudinal direction and intersecting with each other. The two cylindrical holes are mutually communicated in the intersecting part. The axes of the two holes are located on the same horizontal plane when the long sides of the outer peripheral edges of the rectangular first block end face 20a and second block end face 20b are horizontally aligned.

The block body 20 includes an inner peripheral face 21s being the cylinder part 3b that defines the insertion hole 21. The inner peripheral face 21s is made of two arc-like curved faces abutting on each other at both arc ends. In other words, the inner peripheral face 21s is a curved face that has a contour of spectacles and extends in the longitudinal direction. There is a boundary 21t (see FIG. 2) along the abutting part of the two arc-like curved face.

As described above, the integration of the block body 20, the first flange 22, and the second flange 23 forms a first joint 26 between the first block end face 20a and the first flange end face 22a and a second joint 27 between the second block end face 20b and the second flange end face 23a in the barrel block 3p. In the longitudinal direction, the first joint 26 including the first block end face 20a is one end face of the barrel block 3p, and the second joint 27 including the second block end face 20b is the other end face of the barrel block 3p.

To join the two adjacent barrel blocks 3p, the first joint 26 of one barrel block 3p and the second joint 27 of the other barrel block 3p are opposed and come into contact with each other. Bolts and nuts are then inserted into the first bolt holes 24 and the second bolt holes 25, to join the two adjacent barrel blocks 3p with the bolts.

The first joint 26 of one end face of the barrel block 3p will be described in detail below, as viewed from the longitudinal direction.

As illustrated in FIGS. 2 and 3, the first joint 26 includes the first block end face 20a to which the insertion hole 21 is open, and the first flange end face 22a that continuously extends from the outer peripheral edge of the first block end face 20a and to which the first bolt holes 24 are open.

The first joint 26 include a first inner joint face 26a being a flat face perpendicular to the longitudinal direction on the outer periphery of the first hole 21a open to the center of the first block end face 20a. In the first block end face 20a, the first inner joint face 26a continuously surrounds the peripheral edge of the first hole 21a and extends in planar form from the peripheral edge of the first hole 21a toward the outer periphery.

While the two adjacent barrel blocks 3p are in contact with each other, the first inner joint face 26a of the first joint 26 of one barrel block 3p contacts the second joint 27 of the other barrel block 3p.

The inner peripheral edge of the first inner joint face 26a coincides with the peripheral edge of the first hole 21a, and the outer peripheral edge 26b thereof has an elongated circular shape. When the long sides of the outer peripheral edges of the rectangular first and second block end faces 20a, 20b are horizontally aligned, a linear part of the elongated circular outer peripheral edge 26b of the first inner joint face 26a becomes horizontal. The contour of the outer peripheral edge 26b is not limited to an elongated circle, and may be elliptical or oval. The contour of the outer peripheral edge 26b may be any shape that surrounds the first hole 21a in a balanced manner.

The first joint 26 is provided with a first flank face 26c that is recessed (hollowed) from the outer periphery of the first inner joint face 26a toward the second joint 27 (second block end face 20b). In the first block end face 20a and the first flange end face 22a, the first flank face 26c continuously surrounds the outer peripheral edge of the first inner joint face 26a and extends outward from the outer peripheral edge of the first inner joint face 26a to the outer peripheral edge of the first flange end face 22a.

The inner peripheral edge of the first flank face 26c coincides with the outer peripheral edge of the first inner joint face 26a, and the outer peripheral edge thereof coincides with the outer peripheral edge of the first flange end face 22a. The first flank face 26c is preferably a flat face perpendicular to the longitudinal direction, but the first flank face 26c does not need to be planar as long as the first flank face 26c is further recessed toward the second joint 27 than the first inner joint face 26a and a first outer joint face 26e, which will be described later.

While the two adjacent barrel blocks 3p abut on each other or are joined together, the first flank face 26c of the first joint 26 of one barrel block 3p serves as a non-contact face that does not contact the second joint 27 of the other barrel block 3p.

The first joint 26 is further provided with a first projection 26d that projects from the first flank face 26c in the longitudinal direction in the first flange end face 22a. That is, in the first flange end face 22a, the first joint 26 includes the first projection 26d that projects from the first flank face 26c oppositely to the second block end face 20b (second joint 27). The first projection 26d includes, at its tip, the first outer joint face 26e being a flat face perpendicular to the longitudinal direction.

In the first flange end face 22a, the first projection 26d has a rectangular shape on the outer periphery of a group of the rectangularly or substantially rectangularly arranged first bolt holes 24, and continuously surround the first bolt hole group 24. The first outer joint face 26e at the tip of the first projection 26d has a rectangular frame shape. It is preferable that the first outer joint face 26e continuously surround the first bolt hole group 24, but it may be partially provided with a recess, a hollow, and a cutout.

The inner peripheral edge of the frame-shaped, first outer joint face 26e is preferably spaced apart from the peripheral edges of the first bolt holes 24 toward the outer periphery.

In the present embodiment, the first bolt holes 24 and the second bolt holes 25 have counter bores that accommodate the heads of the bolts or nuts. This eliminates unnecessary projections, enabling easier attachment and detachment of the heating device 10 at the time of maintenance of the twin-screw extruder 1, for example.

In such a case, it is preferable that the inner peripheral edge of the first outer joint face 26e be located closer to the outer periphery than the group of the first bolt holes 24 including the counter bores. That is, the inner peripheral edge of the first outer joint face 26e is preferably located closer to the outer periphery than the seating faces of the bolts inserted into the first bolt holes 24. FIGS. 2 and 3 illustrate, as an example, the frame-shaped first outer joint face 26e of which the inner peripheral edge is apart from the first bolt holes 24 including counter bores along the outer periphery, and the outer peripheral edge coincides with the outer peripheral edge of the first flange end face 22a.

The following describes a longitudinal positional relationship among the first inner joint face 26a, the first flank face 26c, and the first outer joint face 26e.

The first outer joint face 26e is closer to the second block end face 20b (second joint 27) than the first inner joint face 26a by about H1 (for example, 0.1 mm to 0.25 mm).

The first flank face 26c is closer to the second block end face 20b (second joint 27) than the first inner joint face 26a by about H2 (for example, 0.3 mm to 0.4 mm).

In addition, the first flank face 26c is closer to the second block end face 20b (second joint 27) than the first outer joint face 26e by about H3 (for example, 0.05 mm to 0.2 mm).

Thus, the first inner joint face 26a is located farthest and the first flank face 26c is located nearest with respect to the second block end face 20b. The first outer joint face 26e is located between the first inner joint face 26a and the first flank face 26c.

The following describes another example of the positional relationship in view of posture. The barrel block 3p is in posture such that the first joint 26 is directed vertically upward and the second joint 27 is directed vertically downward with reference to the first inner joint face 26a.

The first outer joint face 26e is deeper (more recessed) by about H1 than the first inner joint face 26a. In other words, the first outer joint face 26e is lower by about H1 than the first inner joint face 26a.

The first flank face 26c is deeper (more recessed) by about H2 than the first inner joint face 26a. That is, the first flank face 26c is lower by about H2 than the first inner joint face 26a.

In addition, the first flank face 26c is deeper (more recessed) by about H3 than the first outer joint face 26e. In other words, the first flank face 26c is lower by about H3 than the first outer joint face 26e.

Thus, the first outer joint face 26e and the first flank face 26c are deeper (more recessed) in this order than the first inner joint face 26a. That is, the first outer joint face 26e and the first flank face 26c are lower in this order than the first inner joint face 26a.

Since the first outer joint face 26e is closer to the second block end face 20b by about H1 than the first inner joint face 26a, while the two adjacent barrel blocks 3p abut on each other, the first outer joint face 26e of the first joint 26 of one barrel block 3p is not in contact with the second joint 27 of the other barrel block 3p. The first outer joint face 26e contacts the second joint 27 of the adjacent barrel block 3p when the two adjacent barrel blocks 3p are joined together and fastened with the bolts.

It is preferable that the width W of the first outer joint face 26e be set to about 3 to 7 mm. Thereby, when the two adjacent barrel block 3p are joined together, the first outer joint face 26e can entirely contact the second joint 27 of the adjacent barrel block 3p.

The following describes the second joint 27 of the other end face of the barrel block 3p in detail.

As illustrated in FIGS. 2 and 3, the second joint 27 includes the second block end face 20b to which the insertion hole 21 for the screws 2 is open, and the second flange end face 23a that continuously extends from the outer peripheral edge of the second block end face 20b and to which the second bolt holes 25 are open.

The second joint 27 includes a second joint face 27a being a flat face perpendicular to the longitudinal direction on the outer periphery of the second hole 21b open to the center of the second block end face 20b. In the second block end face 20b and the second flange end face 23a, the second joint face 27a continuously surrounds the peripheral edge of the second hole 21b and extends in planar form from the peripheral edge of the second hole 21b to the outer peripheral edge of the second flange end face 23a.

The inner peripheral edge of the second joint face 27a coincides with the peripheral edge of the second hole 21b, and the outer peripheral edge thereof coincides with the outer peripheral edge of the second flange end face 23a.

While the two adjacent barrel blocks 3p abut on each other, the second joint face 27a of the second joint 27 of one barrel block 3p abuts on the first joint 26 of the other barrel block 3p.

The following describes a process of joining the barrel blocks 3p to assemble the continuous barrel 3.

Figure 4:
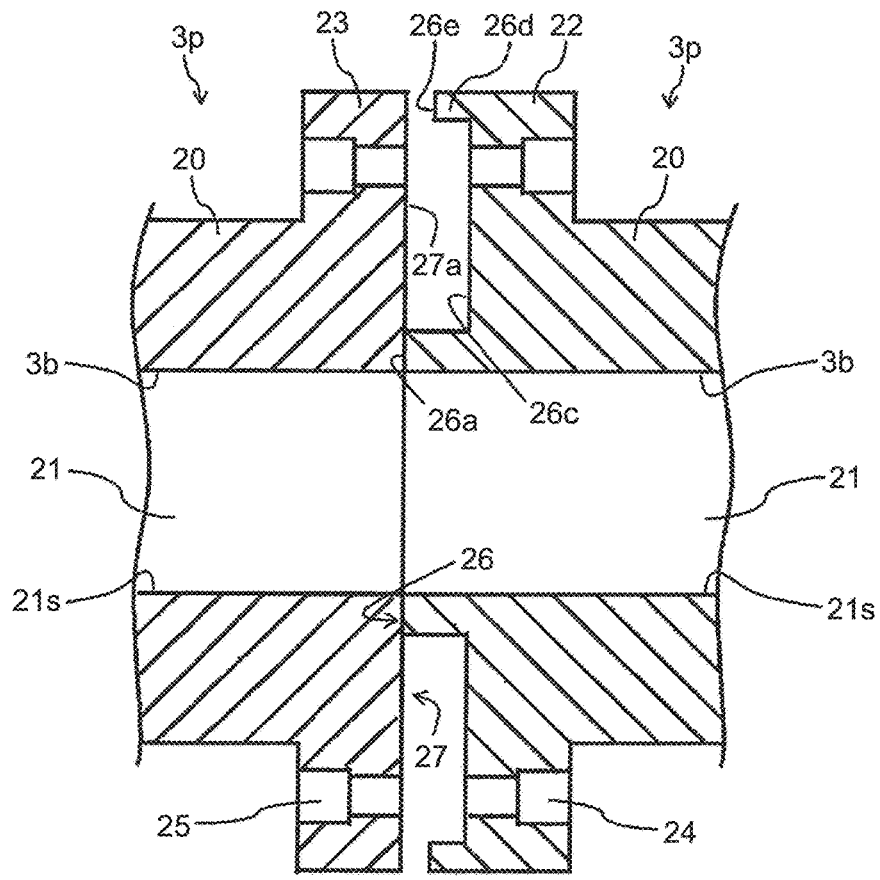
FIG. 4 is a cross-sectional view illustrating a joining state of the barrel blocks for the twin-screw extruder in accordance with the embodiment.

Two of the barrel blocks 3p, i.e., first and second barrel blocks 3p are placed adjacent to each other. The first and second barrel blocks 3p are placed so that the first joint 26 of the first barrel block 3p and the second joint 27 of the second barrel block 3p oppose each other, as illustrated in FIG. 4. Subsequently, the second barrel block 3p is slowly moved closer to the first barrel block 3p until the second joint 27 of the second barrel block 3p abuts on the first joint 26 of the first barrel block 3p. Then, the bolts and nuts are inserted into the first bolt holes 24 and the second bolt holes 25 to join and fasten the adjacent first and second barrel blocks 3p with the bolts.

Next, one of the not-joined barrel blocks 3p, i.e., a third barrel block 3p, is placed adjacent to the second barrel block 3p. The adjacent second and third barrel blocks 3p are placed so that the first joint 26 of the second barrel block 3p and the second joint 27 of the third barrel block 3p oppose each other. The second barrel block 3p and the third barrel block 3p are joined together in the above manner. Through repetition of the process, a certain number of barrel blocks 3p are joined together, assembling the continuous barrel 3 of the joined barrel blocks 3p aligned in a line in the longitudinal direction.

The first inner joint face 26a and the first outer joint face 26e of the first joint 26 of one barrel block 3p tightly contact the second joint face 27a of the adjacent barrel block 3p with no gap. This also forms the continuous cylinder 7 of the mutually connected cylinder parts 3b inside the barrel 3.

According to the present embodiment, in the first joint 26 of each barrel block 3p, the first projection 26d is located on the outer periphery of the first bolt holes 24 open to the first flank face 26c, projecting from the first flank face 26c, and the first projection 26d has the first outer joint face 26e at its tip. This can limit a falling amount of the first flange 22 which occurs due to fastening of the bolts, at the time of joining two adjacent barrel blocks 3p together. In other words, the first flange 22 can be prevented from excessively falling.

In addition, the first outer joint face 26e is located on the outer periphery of the first bolt holes 24, and a part (location) thereof to which the first bolt holes 24 are open serves as the first flank face 26c. In fastening the barrel blocks 3p with bolts, the fastening force of the bolts is transmitted to the first inner joint face 26a and the first outer joint face 26e.

This makes it possible to increase contact pressure between the first inner joint face 26a of the first joint 26 and the second joint 27 of the adjacent barrel block 3p, and achieve uniform contact state (contact pressure) therebetween. This can thus ensure prevention of leakage of a raw material from the gap between the barrel blocks 3p.

In the present embodiment, in order to facilitate the formation of the second joint 27 in the barrel block 3p, the second joint 27 has the second joint face 27a being flat. However, the second joint face 27a may be provided with a recess, a hollow, a cutout, and a flank face in the non-contact area with the first inner joint face 26a and the first outer joint face 26e of the first joint 26 of the adjacent barrel block 3p. In addition, the second joint 27 may have the same structure as the first inner joint face 26a, the first flank face 26c, and the first outer joint face 26e of the first joint 26.

In the present embodiment, the barrel block 3p has the four block side faces 20c, 20d, 20e, and 20f being closed faces, but any of the four block side faces 20c, 20d, 20e, and 20f may be provided with a through-hole that is communicated with the insertion hole 21. Such a barrel block 3p can be used as a feeding barrel block that supplies a raw material to the cylinder 7, a venting barrel block that degasses volatile contents, and a side-feeding barrel block that adds an additive.

Figure 5:
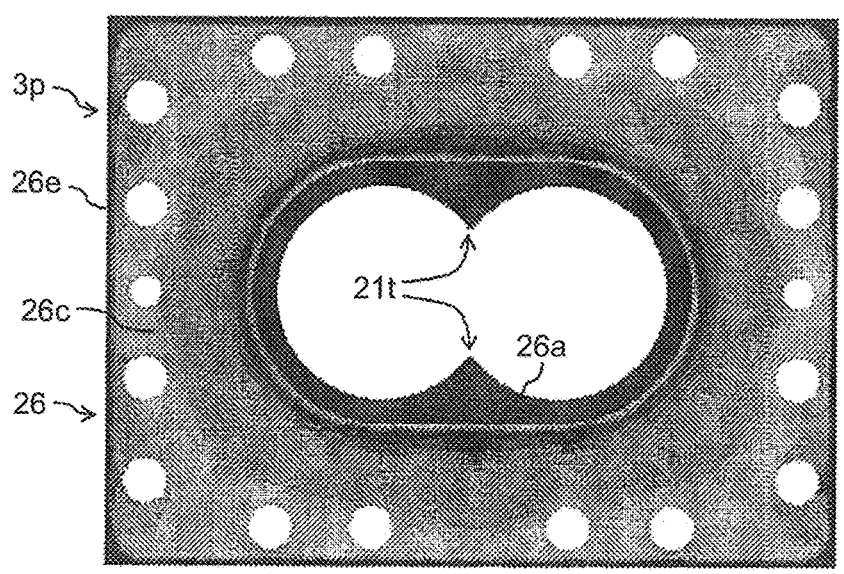
FIG. 5 shows an image schematically illustrating a result of analysis of the joined barrel blocks for the twin-screw extruder in accordance with the embodiment.
Figure 6:
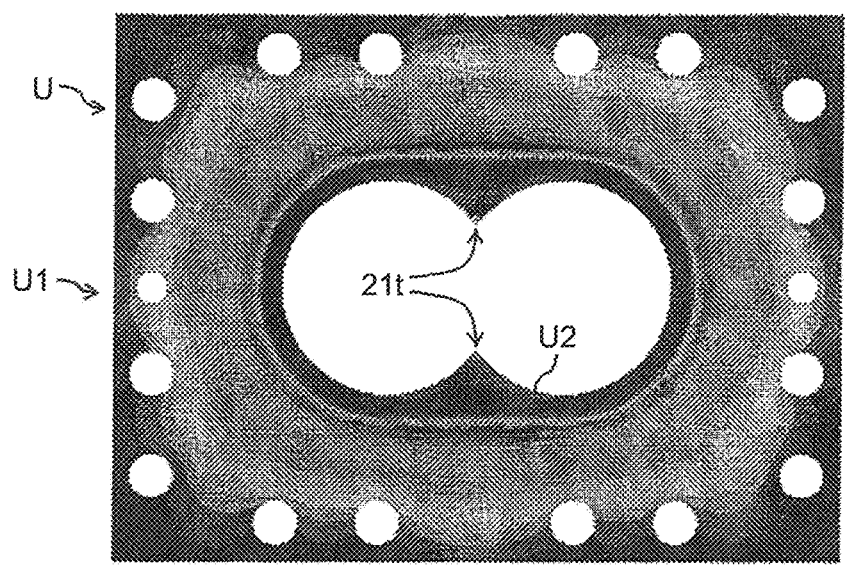
FIG. 6 shows an image schematically illustrating a result of analysis of the joined barrel blocks for a twin-screw extruder in accordance with a conventional embodiment.

FIGS. 5 and 6 illustrate the results of finite element method (FEM) analysis applied to the present embodiment and a conventional embodiment.

In evaluation test using the FEM analysis, the barrel block 3p including the first joint 26 of the present embodiment and a barrel block model U including a conventional joint U1 are prepared. The conventional joint U1 is exemplified by a flanged joint of a screw casing (i.e., a barrel block) having a protrusion around a screw hole (i.e., a cylinder) in Japanese Laid-open Patent Application Publication No. S50-156007.

In the evaluation test by the FEM analysis, the barrel block 3p in the present embodiment and the conventional barrel block U are both joined with the second joint 27 of an adjacent barrel block 3p. Then, the contact pressure of the first joint 26 of the barrel block 3p in the present embodiment and that of the joint U1 of the conventional barrel block U are evaluated. In the evaluation test, the second joint 27 of the adjacent barrel block 3p includes the second joint face 27a being a flat face.

As illustrated in FIG. 5, the barrel block 3p including the first joint 26 of the present embodiment exhibits a uniform contact-pressure distribution over the entire first inner joint face 26a. In FIG. 5, a darkest-color part represents a highest contact-pressure area. By contrast, the conventional barrel block U exhibits lighter color in the vicinity of the boundary 21t of a joint face U2 corresponding to the first inner joint face 26a of the present embodiment, as illustrated in FIG. 6. Thus, it can be seen that the contact pressure of the area is decreased.

Referring to FIG. 5, the barrel block 3p of the present embodiment exhibits darker color in the first outer joint face 26e. Thus, it is apparent that a falling amount of the first flange 22 is reduced by contacting with the first outer joint face 26e. By contrast, the conventional barrel block U exhibits darker color even in the vicinity of bolt holes, as illustrated in FIG. 6. Thus, it can be understood that a flange falls down.

As described above, according to the results of the FEM analysis, it is found that the barrel block 3p including the first joint 26 of the present embodiment exhibits, when joined with another barrel block 3p, uniform contact pressure over the entire first inner joint face 26a, enabling the first inner joint face 26a to contact the adjacent barrel block 3p without any gap. Thus, the effect of the above embodiment is confirmed.

According to the present embodiment, for joining barrel blocks for a twin-screw extruder together, the parts around the cylinders can be brought in close and uniform contact with one another, preventing a raw material from leaking from the gap between the barrel blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A barrel block for a twin-screw extruder, the barrel block that constitutes a barrel and includes joints at both ends, the barrel including a cylinder that rotatably houses two screws, the barrel block comprising:
    a block body of a rectangular parallelepiped shape that includes a first block end face, a second block end face opposite the first block end face, and four block side faces that connect the first block end face and the second block end face;
    a first flange of a rectangular frame shape that projects toward an outer periphery from an outer peripheral edge of the first block end face;
    a second flange of a rectangular frame shape that projects toward an outer periphery from an outer peripheral edge of the second block end face;
    a plurality of first bolt holes formed in the first flange with spacing, and a plurality of second bolt holes formed in the second flange with spacing, the first and second bolt holes that surround the block body; and
    a cylinder part that passes the block body straight from the first block end face to the second block end face and defines an insertion hole for the screws, wherein
    the first block end face and an end face of the first flange forms a first joint, and
    the first joint includes
        a first inner joint face that continuously surrounds a peripheral edge of the insertion hole for the screws,
        a first flank face that is recessed from the outer periphery of the first inner joint face toward the second block end face, and
        a first outer joint face that is located at a tip of a first projection that projects from the first flank face in the outer periphery of the first bolt holes, and
    the first outer joint face is more recessed toward the second block end face than the first inner joint face.

2. The barrel block for a twin-screw extruder according to claim 1, further comprising a second joint including:
    the second block end face to which the insertion hole for the screws is open,
    an end face of the second flange, the end face that continuously extends from the outer peripheral edge of the second block end face and to which the second bolt holes are open, and
    a second joint face that continuously surrounds a peripheral edge of the insertion hole for the screws and extends to the outer peripheral edge of the end face of the second flange.

3. A twin-screw extruder comprising
the barrel block for a twin-screw extruder according to claim 1.

* * * * *